United States Patent [19]

Morimoto

[11] Patent Number: 4,554,166

[45] Date of Patent: Nov. 19, 1985

[54] EXTRUSION PROCESS FOR SHRIMP OR CRABMEAT ANALOG PRODUCTS IN A SERIES OF NON-BOILING GELLING BATHS

[75] Inventor: Keisuke Morimoto, Congers, N.Y.

[73] Assignee: General Foods Corporation, White Plains, N.Y.

[21] Appl. No.: 589,828

[22] Filed: Mar. 15, 1984

[51] Int. Cl.$^4$ ................................................ A23J 3/00
[52] U.S. Cl. ..................................... 426/276; 426/574; 426/656; 426/657; 426/802
[58] Field of Search ............... 426/104, 276, 574, 802, 426/656, 657

[56] References Cited

U.S. PATENT DOCUMENTS

| | | | |
|---|---|---|---|
| 3,093,483 | 6/1963 | Ishler et al. | 426/276 X |
| 3,455,697 | 7/1969 | Atkinson | 426/276 |
| 3,891,776 | 6/1975 | Carpenter et al. | 426/574 X |
| 4,001,441 | 1/1977 | Liepa | 426/802 X |
| 4,006,256 | 2/1977 | Kyros | 426/276 X |
| 4,423,083 | 12/1983 | Shenouda | 426/574 |

Primary Examiner—Robert Yoncoskie
Attorney, Agent, or Firm—Richard D. Schmidt; Thomas A. Marcoux; Daniel J. Donovan

[57] ABSTRACT

Fibrous proteinaceous material useful in the formation of shrimp or crabmeat analog products is prepared by extruding an aqueous solution containing both protein and alginate into a series of two gelling baths, in the first of which gelling baths a high gelling agent cation concentration is maintained which is adapted to readily form a stable surface film on the extrudate, and in the second of such gelling baths, a gelling agent cation concentration lower than that employed in the first gelling bath is employed and for a time sufficient to permit diffusion of the gelling agent cation throughout the extrudate, and recovering, freezing and thawing the extrudate.

22 Claims, No Drawings

4,554,166

EXTRUSION PROCESS FOR SHRIMP OR CRABMEAT ANALOG PRODUCTS IN A SERIES OF NON-BOILING GELLING BATHS

BACKGROUND OF THE INVENTION

1. Field of the Invention

This invention relates to a process for preparing extruded fibrous shrimp or crabmeat analog products from solutions containing both protein and alginate.

2. Description of the Invention

Protein-alginate fibers have been produced from solutions containing both protein, such as soy protein, and alginate salts, as disclosed, for example, in U.S. Pat. Nos. 3,093,483, 3,627,536 and 3,829,587. In the processes disclosed in these references, however, the extrudate is processed, in such a way, through a single gelling bath and under such conditions of temperature and/or pH control as to produce shrimp or crabmeat analog products that do not have as good a combination of the textural, juiciness and chewiness characteristics of natural crabmeat or shrimp as is desired.

Thus, prior to the present invention, it has not been readily possible to produce extruded fibrous shrimp or crabmeat analog products from extrudable solutions of protein and alginate which have an acceptable combination of texture, juiciness and chewiness which approximates that of natural shrimp or crabmeat.

SUMMARY OF THE PRESENT INVENTION

An object of the present invention is to provide an extrusion process wherein extrudable solutions of protein and alginate may be readily extruded into fibrous shrimp analog products having textural, juiciness and chewiness characteristics approximating those of natural shrimp or crabmeat.

These and other objects of the present invention are achieved by extruding an aqueous solution of protein and alginate into a polyvalent cation gelling bath wherein the extrudate is subjected to a series of two non-boiling gelling baths, in the first of which, a high gelling agent cation concentration is maintained which is adapted to readily form a stable surface film on the extrudate, and in the second of such gelling baths, a gelling agent cation concentration lower than that employed in the first gelling bath is employed and for a time sufficient to permit diffusion of the gelling agent cation throughout the extrudate, followed by a freezing and thawing of the extrudate. The fibrous extrudate is then bound by an alginate solution which is set by polyvalent cation diffusion from the fibers.

DESCRIPTION OF THE PREFERRED EMBODIMENTS

The extrudable solution compositions of the present invention contain the following components:

| Component of Extrudable Composition | Weight % Range of Component | |
|---|---|---|
| | Broad | Preferred |
| Water | 75 to 97.5 | 92.5 to 95.0 |
| Protein | 2 to 20 | 4 to 6 |
| Alginate | 0.5 to 5 | 0.5 to 1.5 |

The protein and alginate are used in a weight ratio, with respect to each other, of about 1:1 to 10:1.

These solutions have a natural pH in the range of 5 to 8 and a viscosity of about 200 to 5000 cps, at 25° C.

When extruded into the gelling bath, the solution itself is at a temperature in the range of about 0° to 50° C.

The protein which may be used in these compositions may be of the heat non-coagulable as well as certain heat coagulable types. The heat coagulable types of protein would include those proteins which are insoluble in the gelling baths employed in the present invention, such as vegetable proteins such as soy protein isolate, and soy protein concentrate.

The heat non-coagulable types of protein would include caseinates such as sodium, potassium, and ammonium caseinates.

The useful proteins are those which would have a poor degree of solubility in the gelling baths, i.e., a solubility of less than about 10, and preferably less than about 5, weight %. Thus, proteins which would be highly soluble under the gelling conditions being used such as egg albumin, lactalbumin, gelatin and protein hydrolsates, would not be used in the process of the present invention.

The proteins should also not have too high a concentration of the polyvalent cations used in the gelling agent solution, i.e., a concentration that would lead to gelation of alginates, prior to the fiber forming step in the process, i.e., during the preparation or handling of the extrudable solution. When such cation containing proteins are to be used they must be pretreated with a cation exchange resin prior to the addition of the alginate thereto.

The useful soluble alginates would include the sodium, potassium, and ammonium salts thereof. Alginates having a high molecular weight, as evidenced by a viscosity of about 500 to 1000 cps (as a one weight % aqueous solution) are preferred. The use of the high molecular weight alginates allows one to obtain a desired texture in the analog product at a relatively low level of alginate content.

The gelling agents used in the gelling baths employed in the process of the present invention would include inorganic and organic salts of polyvalent cations which cause gellation of the soluble alginates. These gelling agents would include salts of $Ca^{++}$, $Al^{+++}$ and $Fe^{+++}$ such as calcium chloride, calcium sulfate, calcium acetate, calcium gluconate, calcium lactate, aluminum chloride and ferric chloride.

The gelling agents should not be used in such amounts as would impart a bitter taste to the end product, although excess gelling agent can be washed out of the set fibers to avoid this problem.

Spinning Conditions

The protein-alginate solutions of the present invention may be extruded into the gelling baths by means of any of the conventionally employed extrusion shaping devices employed in the art of making edible fibers such as spinnerettes and nozzles.

These extrusion devices are designed to produce fibers that are about 0.1 to 10, and preferably of about 1 to 5 millimeters in diameter. The fibers of the present invention tend to have a solid cross-section.

Crabmeat analog products are preferably prepared from fibers having a diameter of about 0.5 to 1 mm and the shrimp analog products are preferably prepared from fibers having a diameter of about 5 to 7 mm.

Use of Two Non-Boiling Gelling Baths

The solids concentration of the protein-alginate solution extruded into the first gelling bath should be of a relatively dilute nature, i.e., it should contain about 0.5 to 5 weight % of alginate, about 2 to 20 weight % protein and have a total solids content of about 2.5 to 25. The ratio of protein to alginate in such solution should preferably be about 1:1 to 10:1.

When using the two non-boiling gelling baths the first of such baths has a pH of about 5 to 8, and preferably of about 6 to 7. The preferred gelling agent to be used in the first of such baths is calcium chloride at a 0.5 to 1 weight %.

The first gelling bath is maintained at a temperature, at atmospheric pressure, of about 25° to 90° C. The residence time of the extruded fiber in the first gelling bath is to be long enough for a continuous stable film to form on the surface of the fiber by the chemical action of the gelling agent cation on the alginate in the extrudate. This will take about 1 to 10 minutes depending on the cation concentration in the gelling agent bath.

At 25° C., a residence time in the first non-boiling bath of about 10 minutes is adequate for a thick fiber that is about 5 mm in diameter, and 1 minute is adequate for a thin fiber that is about 1 mm in diameter.

The extruded fiber, with a continuous surface film thereon, is then transferred from the first gelling bath to the second gelling bath with or without washing of the fiber. The fiber need only be washed, or rinsed, with water at this point in time if the cation concentration is considered to be too high.

In the second gelling bath, calcium chloride is used at a weight % of about 0.1 to 0.3 and preferably of about 0.15 to 0.25%. The second bath has a pH of about 5 to 8 and preferably of about 6 to 7. It is maintained at atmospheric pressure, of about 25° to 90° C. The residence time of the extruded fiber in the second non-boiling gelling bath is to be for a time long enough to permit complete diffusion of the cation therein throughout the entire body to the fibrous extrudate, and thus lead to a reaction between such cation and all of the alginate in the fiber. This will take about 10 to 40 minutes, depending on the cation concentration in the gelling bath, and on the thickness of the fiber.

At 90° C., a residence time in the second bath of about 15 to 20 minutes is adequate for a fiber of about 5 mm in diameter, and 5 to 10 minutes is adequate for a fiber of about 1 mm in diameter.

When the diffusion of calcium ion into the fiber is complete, the fiber is then frozen and thawed to promote syneresis, the extent of which determines the texture of the fiber product as well as the fiber water content. No difference in eating quality was noticed when this fiber was compared with one made by the use of a single boiling gelling bath, which technology is disclosed in a United States patent application filed on even date herewith in the name of K. Morimoto, et al. under attorney docket No. 5072 and entitled "Extrusion Process For Shrimp or Crabmeat Analog Products Using Single Boiling Gelling Bath". The freezing conditions used in this regard were at −20° C. As long as the fiber is frozen and its temperature is dropped to at least −20° C., it can be thawed to achieve the desired beneficial effect on the fiber texture. The fibers made by the use of a single boiling bath, as referred to above, on the other hand, has already attained its desired textural properties in such boiling bath, and has no need for freezing and thawing cycle of steps for texture forming purposes.

Molding of Shrimp or Crabmeat Analog

After being fully treated in the two non-boiling gellings baths, followed by the freezing and thawing steps, any excess moisture in the fiber, in the form of the extrusion solution or the gelling bath solution, is removed therefrom, as by compression of the fibrous mass. The desired moisture content for the product at this point should be about 65 to 80, and preferably about 70 to 75 weight % for shrimp and crabmeat analog products.

The continuous fiber may then be cut into smaller segments of about 3 to 5 centimeters.

To prepare a molded analog product, the fibers are mixed with a binder solution containing about 1 to 5, and preferably of about 2 to 3, weight % of an alginate and placed in a mold. The fibers are added to the binder solution in a weight ratio of the wet fibers (containing about 70 to 75 weight % moisture) to liquid binder solution of about 5 to 0.5:1 and preferably of about 2±0.5:1. The mold employed has the shape of the desired product, i.e., shrimp or crabmeat shaped.

The mixture of the fiber and binder solution is retained in the mold at room temperature, 25±5° C., for a period of time sufficient to permit residual polyvalent cation from the gelling agent solution which is still in the fiber to diffuse into the surrounding binder solution and cause gellation of the binder. For this purpose, the residual calcium ion concentration in the fiber should be about 0.1 to 0.4 weight %.

The time required for this gellation of the fiber/binder system to occur may be about 10 to 20 minutes depending on the ratio of fiber to binder, and the cation concentration in the fiber. The resulting gelled product can be considered a mass of fibers bound together by the gelled alginate in molded or loaf form.

The thus prepared analog product can be used as is, or frozen for future use. It need not be cooked prior to being eaten.

For the production of an analog product in the form of loose crabmeat, the above described binding step is not needed and the fibers of about 1 to 2 millimeters in diameter, and about 1 to 5 centimeters in length, can be used, unbound, for this purpose.

The following example is merely illustrative of the present invention and is not intended as a limitation upon the scope thereof.

EXAMPLE

An extrudable aqueous solution was prepared containing 5 weight % sodium caseinate and 1.25 weight % of sodium alginate and then extruded into a 0.5 weight % aqueous solution of calcium chloride through a nozzle having an opening of 5 mm. The temperature of the extruded solution and that of the bath were 25° C. After 10 minutes residence time in the 25° C. bath, during which a continuous stable film formed on the surface of the extruded fiber, the fiber was then placed in a second gelling bath which was a 0.2 weight % aqueous solution of calcium chloride and wherein the calcium ion diffusion process (or alginate/calcium ion reaction process) was allowed to continue for another 30 minutes at a bath temperature of 25° C. The resulting fiber was collected from the second gelling bath and was then frozen at −20° C. for 1 day. The frozen product was then thawed at room temperature and compressed through a set of rollers to remove water released by syneresis, as a result of the freezing/thawing cycle. The solids content of the fiber was then 24 weight %. The continuous fiber was then cut into 5 cm long lengths and placed in a 3 weight % solution of sodium alginate wherein the weight ratio of wet fiber to the alginate solution was 2 to 1. The mixture was then placed in a shrimp mold and allowed to stand at room temperature for 10 minutes to allow the alginate solution to gel due to diffusion of calcium ions from the wet caseinate-alginate fibers to the alginate solution. The resulting shrimp shaped analog product was then recovered from the mold and frozen at $-20°$ C. Upon being thawed, the product had the desired texture, juiciness and chewiness of natural shrimp.

What is claimed is:

1. In a process for the formation of a fibrous material useful in the formation of shrimp or crabmeat analog therefrom which is subject to freeze-thaw cycling by extruding an aqueous solution of protein and alginate into a gelling bath, the improvement which comprises:
   (a) using only protein which has a solubility of less than about 10% in a gelling bath;
   (b) extruding said solution into a first gelling bath having a high gelling agent cation concentration, in the range from about 0.18 to about 0.36 weight %, adapted to readily form a stable surface film on the extrudate;
   (c) transferring said extrudate into a second gelling bath having a gelling agent cation concentration in the range from about 0.036 to about 0.108 weight % and for a period of time sufficient to permit diffusion of said cation throughout said extrudate; and
   (d) recovering, freezing and thawing said extrudate.

2. A process as in claim 1 in which said solution of protein and alginate comprises about 2 to 10 weight % of protein and about 0.5 to 3.0 weight % of alginate.

3. A process as in claim 1 in which said protein has a solubility of less than about 5% in said gelling bath under said gelling conditions.

4. A process as in claim 1 in which said protein, prior to contact with said alginate, is pretreated to remove excess polyvalent cation therefrom.

5. A process as in claim 3 in which said protein is a heat coagulable protein or a non-heat coagulable protein.

6. A process as in claim 5 in which said protein is a heat coagulable protein.

7. A process as in claim 6 in which said protein is selected from the group consisting of soy protein isolate and soy protein concentrate.

8. A process as in claim 5 in which said protein is a non-heat coagulable protein.

9. A process as in claim 8 in which said protein is selected from the group consisting of sodium caseinate, potassium caseinate and ammonium caseinate.

10. A process as in claim 4 in which said alginate is selected from the group consisting of sodium alginate, potassium alginate and ammonium alginate.

11. A process as in claim 1 in which said gelling bath is an aqueous solution comprising at least one compound of at least one cation selected from the group consisting of $Ca^{+2}$, $Al^{+3}$ and $Fe^{+3}$.

12. A process as in claim 11 in which said cation is calcium.

13. A process as in claim 12 in which said compound is selected from the group consisting of calcium acetate, calcium lactate, calcium gluconate, calcium sulfate, calcium chloride, aluminum chloride, and ferric chloride.

14. A process as in claim 1 in which said solution of protein and alginate, at 0° to 50° C., is extruded into said gelling bath.

15. A process as in claim 1 in which an extrudate is produced in the form of solid fibers having a diameter of about 0.1 to 10 millimeters.

16. A process as claimed in claim 1 in which the extrudate is maintained, under non-boiling conditions, in said first gelling bath for about 1 to 10 minutes, and in said second gelling bath for about 10 to 40 minutes.

17. A process as in claim 16 in which an extrudate is produced in the form of solid fibers having a diameter of about 5 to 7 millimeters.

18. A process as in claim 16 in which an extrudate is produced in the form of solid fibers having a diameter of about 0.5 to 1 millimeter.

19. A process as in claim 1 in which said aqueous solution comprises, in weight percent:
   75 to 97.5% distilled water;
   2 to 20% protein; and
   0.5 to 5% alginate.

20. A process as in claim 1 in which said protein and said alginate are employed in a weight ratio to each other of about 1:1 to 10:1.

21. A process as in claim 1 further comprising the steps of recovering the gelled fibers, removing excess water therefrom, cutting the fibers into suitable lengths, binding the cut fibers with an alginate solution in a shrimp or crabmeat shaped mold.

22. A process as in claim 21 further comprising the steps of freezing the molded shaped product for a period of time sufficient to form a tough outer film thereon resembling the connective membrane of shrimp.

* * * * *